United States Patent Office 3,296,619
Patented Jan. 3, 1967

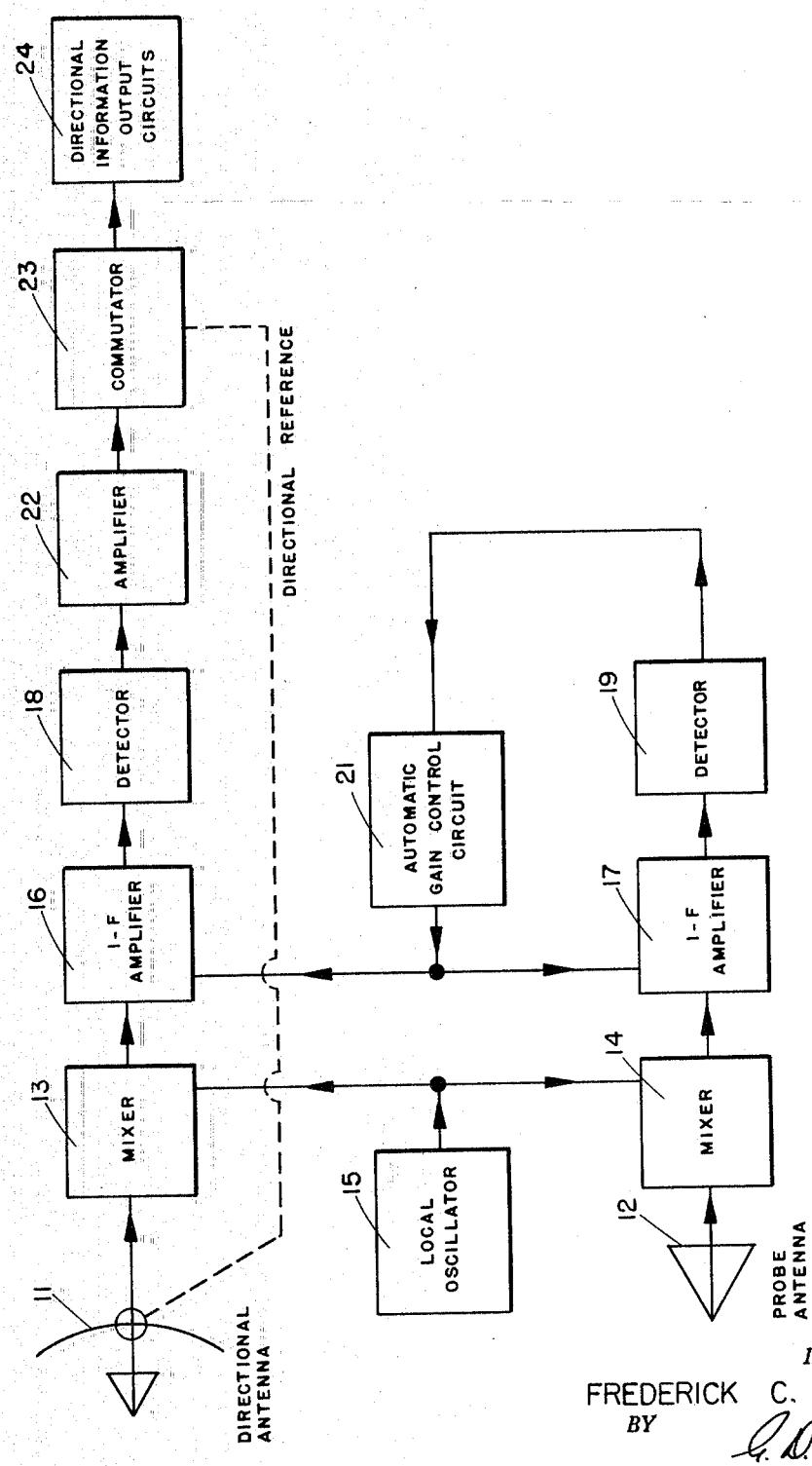

3,296,619
SIMPLE FORM OF PROBE ANTENNA NOISE
CANCELLATION SYSTEM
Frederick C. Alpers, Riverside, Calif., assignor to the United States of America as represented by the Secretary of the Navy
Filed June 29, 1956, Ser. No. 595,019
4 Claims. (Cl. 343—120)

The invention described herein may be manufactured and used by or for the Government of the United States of America for governmental purposes without the payment of any royalties thereon or therefor.

This invention relates to a simple form of probe antenna noise cancellation system and more particularly to a system and apparatus adapted to provide a means of obtaining accurate directional information regarding the relative position of a source of electromagnetic radiation.

In military applications this directional information might be used as a basis for a missile homing on the source of radiation or as a basis for fire control against the source. The source might be an enemy radio or radar installation or a jamming device which emits a signal which is modulated either in accordance with carrying out its normal functions or is modulated intentionally in order to jam normal directional information equipment. Since this modulation, whether intentional or not, tends to make accurate direction finding difficult, it can be termed noise insofar as the directional information equipment is concerned. This invention provides a means whereby the noise may be automatically cancelled out and the desired information obtained.

There are three older methods of gaining directional information regarding a source of electromagnetic radiation: (1) mechanical scanning, (2) electronic lobe switching, and (3) simultaneous lobing. The first two methods encounter difficulties when there is noise present at the source which occurs in the same frequency band as the scanning or switching frequency, and this is commonly the case. The third method is generally preferable to the other two, but it involves use of a complex RF system.

Briefly stated, the present invention consists essentially of a receiver having two antennas one of which is a directional antenna and the other a fixed probe antenna. The signals of both antennas are mixed with a signal from a local oscillator and the IF frequency is then detected. The detected signal from the probe antenna is applied to an automatic gain-control circuit which in turn is connected to the IF amplifiers of both channels. The detector output from the directional antenna channel is applied through an amplifier to a commutator circuit which is connected to the directional antenna and also feeds directional information output circuits. The automatic gain control as applied to the probe antenna channel tends to keep the output of the IF amplifier in this channel constant and as applied to the directional antenna channel tends to automatically cancel out the noise modulation and provide the desired directional information.

One object of the present invention is to provide means for obtaining accurate directional information regarding the relative position of a source of electromagnetic radiation.

Another object of the present invention is to provide a simple system of obtaining directional information whereby the noise may be automatically cancelled out and the desired information obtained.

A further object of the present invention is to provide a system and apparatus for obtaining noise-free directional information for scanning and switching type directional systems without introducing undue complexity.

Other objects and many of the attendant advantages of this invention will be readily appreciated as the same becomes better understood by reference to the following detailed description when considered in connection with the accompanying drawing wherein:

The single figure of the drawing is a block diagram illustrating one preferred embodiment of the present invention wherein two antennas are used, one of which, the directional antenna 11, receives a product of a noise signal $f(t)$ and a directional signal $g(t)$, and the other of which, the probe antenna 12, receives only the noise signal $f(t)$. A means is then provided whereby the signal from the first antenna 11 is divided by the signal from the second antenna 12. Neglecting the constants involved, this gives $f(t)g(t)/f(t)=g(t)$ which is the directional signal free from the noise effects. Thus the over-all system is a noise cancellation system.

The directional antenna 11 is either a mechanically-scanned or electronically-switched antenna hereafter referred to as a directional antenna which, by commonly understood techniques, receives signals alternately from different directions so that the signals received may later be compared in order to determine the direction in which the signal originated. The second antenna 12 is a fixed antenna hereafter called a probe antenna which receives the signals without any directional sensing involved. Except for the scanning or switching action of the one antenna 11, the two antennas are generally alike although they need not be precisely aligned with respect to each other, and they need not have the same gain or beam width. About the only requirements of close similarity between the antennas which arise are those which arise if either the source frequency or the source polarization is varied rapidly. In these special cases the antennas must be fairly well matched in band width and polarization characteristics, but this is not overly difficult.

The signal from the directional antenna 11 is fed to a mixer 13 and the signal from the probe antenna 12 is fed to the mixer 14. The respective mixers 13 and 14 then develop corresponding intermediate frequency signals through use of a local oscillator signal from the local oscillator 15 in accordance with the well known superheterodyne principle. Alternately, the antennas 11 and 12 might feed detectors and then directly video or audio frequency amplifiers, but the intermediate frequency system is preferred for ease of gain control. The two intermediate frequency signals each are processed through their respective IF amplifiers 16 and 17 and through what is commonly known as second detector circuits 18 and 19. However, following this point the two channels differ.

The output signal from the detector 19 in the probe antenna channel is fed either directly or through signal selector and ranging circuits (not shown) to an automatic gain control circuit 21. The connection through a signal selector circuit may be utilized where the system is being used against a radar source and it is desirable to distinguish one source from another. The additional connection through a ranging circuit may be utilized where the system is used in connection with an active radar operating against a jamming source. The automatic gain control circuit 21 is in turn connected to the intermediate frequency amplifiers 16 and 17 of both channels.

The output of detector 18 in the directional antenna channel is connected directly or indirectly through selector and ranging circuits (not shown), as explained for the probe channel above, to a video or audio amplifier 22 and then to a commutator circuit 23. The latter may be either electronic or mechanical, but it must incorporate a referencing arrangement which connects it to the directional antenna as shown. The commutator 23 then feeds directional information output circuits 24 commonly known in the art.

OPERATION

A discussion of the operation may begin by considering the probe antenna channel. The signal developed in this channel through commonly known techniques is used as an input to the automatic gain control circuit 21. This circuit then controls the gain of both channels in accordance with the input from the probe channel alone. The feedback which thus occurs from the output of the probe channel back to the IF amplifier 17 in that channel acts to keep the output constant. This is true since the amplifiers in both the IF and gain control circuits have a very high over-all gain, and any tendency of the output to drop below the predetermined constant valve is quickly counteracted by an increase in gain, and a tendency toward a higher output is likewise counteracted by a decrease in gain. Mathematically, this action may be expressed by saying that if the input is some variable function of time $f(t)$ then the gain G through the probe channel is automatically adjusted so that to a very close approximation $G=K/f(t)$ and the output $Gf(t)$ becomes $(K/f(t))f(t)=K$, the constant value.

Now consider the directional antenna channel. The input signal there is the same signal $f(t)$ modulated by a scanning or switching function $g(t)$ and subject to a constant additional gain or loss M occasioned by any difference in gains and alignment between the probe and directional antennas 11 and 12. Thus, mathematically, the input can be represented by the product $Mf(t)g(t)$. This input after conversion to the intermediate frequency is fed into the directional channel IF amplifier 16, which is pre-adjusted to have the same dynamic response to automatic gain control action as the probe channel IF amplifier 17 had. However, the two IF amplifiers may differ in over-all gain by a factor N. Mathematically the gain of the directional channel IF amplifier is then $G^1=NK/f(t)$. When this amplifier acts upon the input, the output is the product $(Mf(t)g(t))$ $$NK/f(t)=MNKg(t)$$

which is simply a constant times the function resulting from the scanning or switching action.

With the noise function $f(t)$ thus removed from the signal emerging from the IF amplifier 16 in the directional channel, the remaining operation of system elements is similar to that of the usual mechanically scanned or electronically switched fire control or homing device. An amplifier 22 brings the signal up to a higher power level. A commutator 23 sorts it into up, down, right, and left quadrants in synchronism with the scanning or switching action of the antenna 11. Directional information output circuits 24 then process the up, down, right, and left signals into desired form.

In the above discussion it was assumed that the automatic gain control circuit 21 accomplishes its feedback function without any particular time delay involved in the process. Actually a practical gain control circuit has time constants which delay its operation somewhat and limit its usefulness against high frequency variations in the function $f(t)$ being controlled. Thus practical considerations limit the usefulness of the present invention to cancellation of source noise which is of a lower frequency character than the capabilities of the gain control circuit 21, and some, but not all, applications of this simple system are precluded by this limitation.

The foregoing discussion has pointed out the use of this invention in a passive system, that is, in a system which only receives an incoming signal from a radio, radar, or jamming device source. It will be apparent to one skilled in the art that the invention may be similarly employed in an active radar system provided well known and readily under stood duplexer and transmitter connections are made either between the probe antenna and the associated mixer or between the directional antenna and the associated mixer. When these connections are accomplished, the transmitter sends radiation out from the antenna via the duplexer, and the duplexer prevents the radiation from entering the mixer and thus the later circuits to any great extent. Returning echo radiation from a target object then enters the antenna as if it were radiation emitted from target, and for the received radiation the duplexer acts by well known techniques to connect the antenna to the mixer rather than to the transmitter. Thus in the active case the present invention acts just as in the passive case except that the incoming signal is an echo signal rather than a signal directly from a source. The invention can thus cancel out fluctuations in the echo return in the same manner in which it cancels out noise modulation in the passive case.

It will be apparent that the present invention provides a means of obtaining noise-free directional information for scanning and switching type directional systems without introducing undue complexity.

Alternate methods of construction and improvements to certain portions of the system illustrated and described in the present application are disclosed in the co-pending application of Frederick C. Alpers entitled, "Delay Type Probe Antenna Noise Cancellation System," Serial No. 595,020, filed June 29, 1956.

Obviously many modifications and variations of the present invention are possible in the light of the above teachings. It is, therefore, to be understood that within the scope of the appended claims the invention may be practiced otherwise than as specifically described.

What is claimed is:

1. A system for obtaining accurate directional information regarding the relative position of a source of electromagnetic radiation comprising a directional antenna adapted to receive signals from said source alternately from different directions, a probe antenna, a mixer associated with each of said antennas, a local oscillator associated with both of said mixers and adapted to supply the same local oscillator signal to said mixers, an IF amplifier associated with each of said mixers, a detector associated with the IF amplifier in the probe antenna channel, an automatic gain control circuit adapted to receive a signal from said detector and apply automatic gain control to both of said IF amplifiers which is inversely proportional to the signal from the probe antenna, a commutator circuit associated with said IF amplifier in the directional antenna circuit and adapted to receive directional reference information from said directional antenna, and directional information output circuits adapted to utilize the output from said commutator circuit by comparing said alternate signals to determine the direction in which the signal from said source originated.

2. A system for obtaining accurate directional information regarding the relative position of a source of electromagnetic radiation comprising a directional antenna adapted to receive signals from said source alternately from different directions, a probe antenna, a mixer associated with each of said antennas, a local oscillator associated with both of said mixers and adapted to supply the same local oscillator signal to said mixers, an IF amplifier associated with each of said mixers, a detector associated with the IF amplifier in the probe antenna channel, an automatic gain control circuit adapted to receive a signal from said detector and apply automatic gain control to both of said IF amplifiers which is inversely proportional to the signal from the probe antenna, a detector associated with said IF amplifier in the directional antenna circuit, an amplifier associated with said last detector, a commutator circuit associated with said amplifier and adapted to receive directional reference information from said directional antenna, and directional information output circuits adapted to utilize the output from said commutator circuit by comparing said alternate signals to determine the direction in which the signal from said source originated.

3. A system for obtaining accurate directional information regarding the relative position of a source of electromagnetic radiation comprising a directional antenna adapted to receive signals from said source alternately from different directions, a probe antenna, and an automatic gain control circuit adapted to receive a signal from said source through said probe antenna and apply a feedback to both the directional antenna channel and the probe antenna channel which is inversely proportional to said probe antenna signal whereby the output of said probe antenna channel is maintained constant and the output from said directional antenna channel is a function resulting from the directional action of said directional antenna, a commutator circuit associated with said directional antenna channel and adapted to receive directional reference information from said directional antenna, and directional information output circuits adapted to utilize the output from said commutator circuit by comparing said alternate signals to determine the direction in which the signals from said source originated.

4. A system for obtaining accurate directional information regarding the relative position of source of electromagnetic radiation comprising a directional antenna adapted to receive signals from said source alternately from different directions, a probe antenna, and an automatic gain control circuit adapted to receive a signal $f(t)$ from said source through said probe antenna and apply a feedback $K/f(t)$ to both the directional antenna channel and the probe antenna channel which is inversely proportional to said probe antenna signal whereby the output of said probe antenna channel is maintained constant and the output from said directional antenna channel is a function $g(t)$ resulting from the directional action of said directional antenna, a commutator circuit associated with said directional antenna channel and adapted to receive directional reference information from said directional antenna, and directional information output circuits adapted to utilize the output from said commutator circuit by comparing said alternate signals to determine the direction from which the signal from said source originated.

References Cited by the Examiner
UNITED STATES PATENTS

| | | | |
|---|---|---|---|
| 1,556,137 | 10/1925 | Weagant | 343—100 |
| 1,916,358 | 7/1933 | Bruce | 343—115 |
| 2,026,254 | 12/1935 | Sandfort | 343—119 |
| 2,062,906 | 12/1936 | Hooven | 343—119 |
| 2,425,102 | 8/1947 | Larson | 343—118 |

CHESTER L. JUSTUS, *Primary Examiner.*

R. E. BERGER, *Assistant Examiner.*